United States Patent
Bertram (10) Patent No.: US 9,702,433 B2
(45) Date of Patent: Jul. 11, 2017

(54) INTERNAL COMBUSTION ENGINE WITH CENTRIFUGAL PENDULUM DEVICE, AND METHOD FOR PRODUCING THE CENTRIFUGAL PENDULUM DEVICE OF SUCH AN INTERNAL COMBUSTION ENGINE

(71) Applicant: Ford Global Technologies, LLC, Dearborn, MI (US)

(72) Inventor: Ulrich Bertram, Bergheim (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/250,066

(22) Filed: Apr. 10, 2014

(65) Prior Publication Data
US 2014/0305258 A1    Oct. 16, 2014

(30) Foreign Application Priority Data

Apr. 11, 2013    (DE) .................. 10 2013 206 373

(51) Int. Cl.
*F16F 15/14*        (2006.01)
*F16F 15/30*        (2006.01)

(52) U.S. Cl.
CPC ............ *F16F 15/30* (2013.01); *F16F 15/145* (2013.01); *F16F 2226/04* (2013.01); *Y10T 29/49231* (2015.01); *Y10T 74/2128* (2015.01)

(58) Field of Classification Search
CPC .. F16F 15/14; F16F 15/28; F16F 15/31; F16F 15/315

USPC ......................................................... 74/574.2
See application file for complete search history.

(56) References Cited

U.S. PATENT DOCUMENTS

| | | | | |
|---|---|---|---|---|
| 2,079,227 A | * | 5/1937 | Sarazin ...................... | 74/574.3 |
| 2,378,592 A | * | 6/1945 | Specht ......................... | 74/604 |
| 5,619,887 A | * | 4/1997 | Simpson ..................... | 74/574.2 |
| 8,910,762 B2 | * | 12/2014 | Takikawa et al. ............ | 188/378 |
| 2012/0304808 A1 | * | 12/2012 | Amano et al. ............... | 74/574.2 |
| 2013/0133476 A1 | | 5/2013 | Kremer et al. | |

FOREIGN PATENT DOCUMENTS

| | | | |
|---|---|---|---|
| DE | 3825258 A1 | * | 2/1990 |
| DE | 102004011830 A1 | | 9/2004 |
| DE | 102006028556 A1 | | 1/2007 |
| DE | 102011103471 A1 | | 12/2011 |
| DE | 102011105029 | * | 12/2011 |
| DE | 102011088925 A1 | | 6/2013 |
| WO | 2011157255 A1 | | 12/2011 |

* cited by examiner

*Primary Examiner* — Vicky Johnson
(74) *Attorney, Agent, or Firm* — James Dottavio; McCoy Russell LLP (57) ABSTRACT

An internal combustion engine with a centrifugal pendulum device having a pendulum mass carrier, a moveable coupling element rotatably coupled to the pendulum mass carrier via a first bearing element, the coupling element forming a continuous piece of material, and two pendulum masses spaced away from one another and rotatably coupled to the coupling element via a second bearing element and a third bearing element.

15 Claims, 4 Drawing Sheets

INTERNAL COMBUSTION ENGINE WITH CENTRIFUGAL PENDULUM DEVICE, AND METHOD FOR PRODUCING THE CENTRIFUGAL PENDULUM DEVICE OF SUCH AN INTERNAL COMBUSTION ENGINE

CROSS REFERENCE TO RELATED APPLICATION

The present application claims priority to German Patent Application No. 102013206373.3, filed Apr. 11, 2013, the content of which is hereby incorporated by reference for all purposes.

FIELD

The present disclosure relates to an internal combustion engine with a centrifugal pendulum device.

BACKGROUND AND SUMMARY

Engines include a number of rotational components such as crankshafts. The rotary oscillations of the crankshaft lead to rotational speed oscillations of the internal combustion engine, and are also transmitted via the timing drive or camshaft drive to the camshaft, the camshaft itself also being an oscillatory system which can excite vibration in further systems, such as valve mechanisms. The transmission of vibration to other ancillary units via components driven by the crankshaft is also possible. In addition, the oscillations of the crankshaft are transmitted to the drive train, via which they may be transmitted onwards to the transmission and the drive shafts and as far as the tires of a vehicle. Centrifugal pendulum devices may be used in engines to attenuate vibrations in the crankshaft and drive train.

Figure 1A:
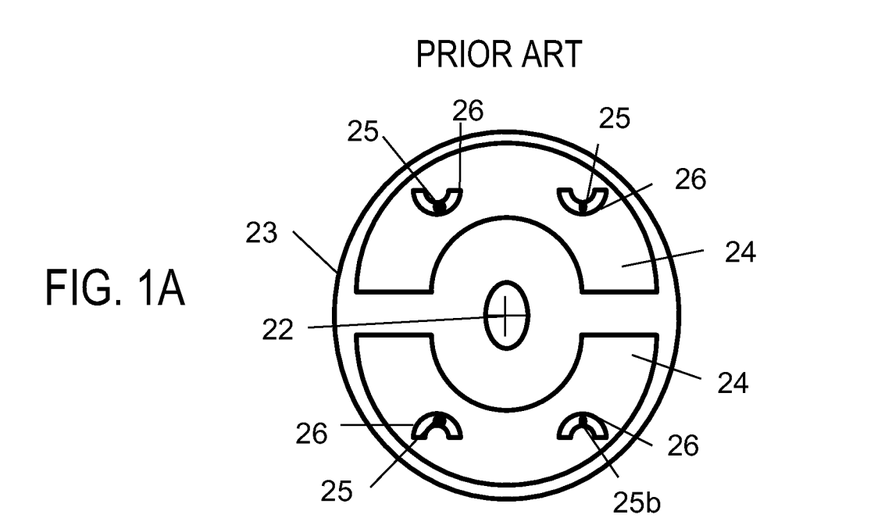
FIG. 1A shows schematically in a side view of a prior art centrifugal pendulum device in the zero state.
Figure 1B:
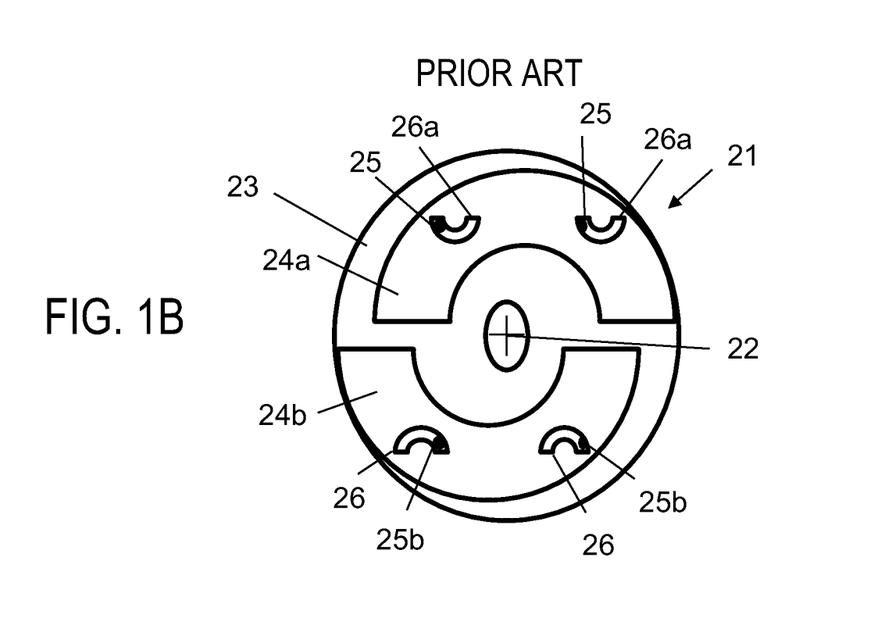
FIG. 1B shows schematically in a side view the prior art centrifugal pendulum device represented in FIG. 1A in a working position.
Figure 1C:
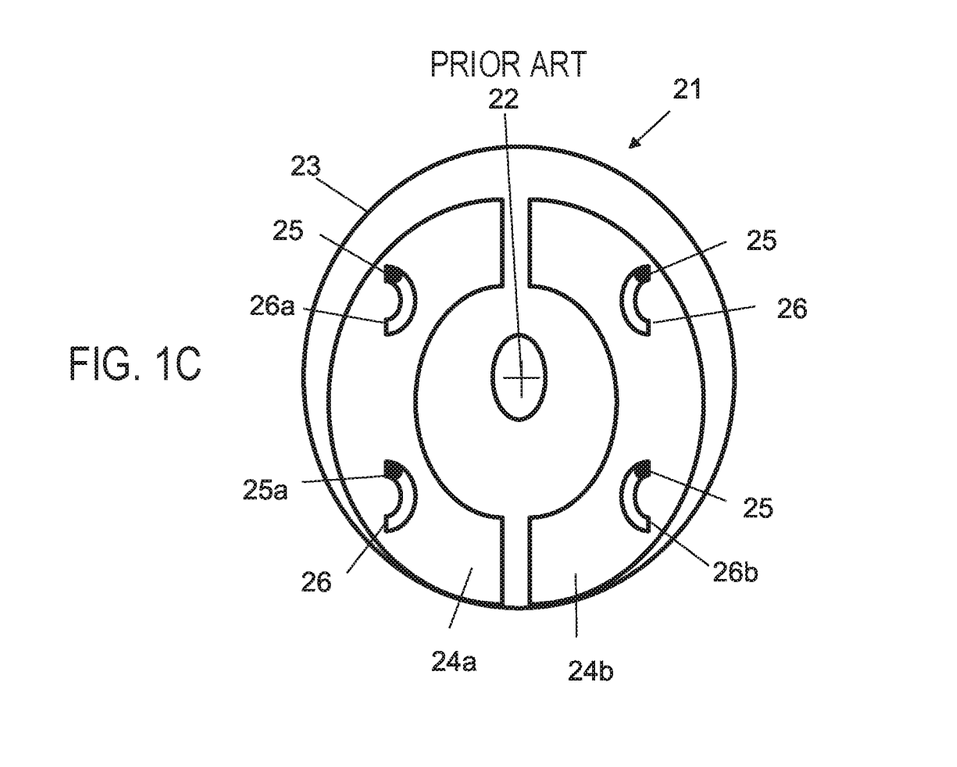
FIG. 1C shows schematically in a side view the centrifugal pendulum device represented in FIG. 1A in a position in which the internal combustion engine is inoperative.

The German published patent application DE 10 2006 028 556 A1 describes such a centrifugal pendulum device. The device is positioned in a drive train of a motor vehicle and used to absorb and/or damp rotary oscillations in the drive train. The centrifugal pendulum device of DE 10 2006 028 556 A1 has a pendulum mass carrier rotatable about an axis of rotation and at least one pendulum mass pair comprising two pendulum masses arranged movably on the pendulum mass carrier opposite one another and at a distance from the axis of rotation. The pendulum masses are connected to the pendulum mass carrier, the pendulum masses having arcuate openings in which rollers provided on the pendulum mass carrier are supported and guided. The arcuate openings form the tracks for the rollers and guide the movement of the pendulum masses. Prior art FIGS. 1a, 1b and 1c show in a simplified schematic representation a prior art centrifugal pendulum device as disclosed in DE 10 2006 028 556 A1, FIG. 1a showing the prior art centrifugal pendulum device in the so-called zero state, FIG. 1b shows the prior art device in a working position, and FIG. 1c shows the prior art device in a position when the vehicle stationary, that is, when the internal combustion engine inoperative and not producing output power. Another centrifugal pendulum device is described in the German published patent application DE 10 2011 105 029 A1.

The centrifugal pendulum device 21 represented in the prior art figures has a pendulum mass carrier 23 rotating about an axis of rotation 22 and two pendulum masses 24a, 24b arranged movably on the pendulum mass carrier 23 and forming a pendulum mass pair 24. The pendulum masses 24a, 24b have arcuate openings 26a, 26b, are located opposite one another, are spaced from the axis of rotation 22, and are mounted and positively guided kinematically by means of roller pins 25a, 25b of the pendulum mass carrier 23 engaging in the openings 26a, 26b. The pendulum masses 24a, 24b of FIG. 1b are located opposite one another and the pendulum masses 24a, 24b are spaced away from the axis of rotation 22 as soon as their centers of gravity are at a distance from the axis of rotation 22. The arcuate openings 26a, 26b represent the tracks 26a, 26b for the roller pins 25a, 25b and therefore guide movement of the pendulum masses 24a, 24b.

When the internal combustion engine is inoperative and the vehicle at a standstill, and when the pendulum mass carrier is stationary, the pendulum masses 24a, 24b can adopt the position represented in FIG. 1c and thus form an unbalanced mass. This gives rise to problems, especially when the pendulum mass carrier 23 is set in rotation again. For example, when the internal combustion engine is started and the pendulum masses 24a, 24b must first settle into a working position as represented in prior art FIG. 1b during this start-up process, that is, as the rotary motion begins. Increased noises, combined with high stress on the pendulum mass bearings, in particular the roller pins, may result from the prior art centrifugal pendulum device illustrated in FIGS. 1a, 1b, and 1c.

As such in one approach, a centrifugal pendulum device in an engine is provided. The centrifugal pendulum device includes a pendulum mass carrier, a moveable coupling element rotatably coupled to the pendulum mass carrier via a first bearing element, the coupling element forming a continuous piece of material, and two pendulum masses spaced away from one another and rotatably coupled to the coupling element via a second bearing element and a third bearing element.

Jointly rotationally coupling the pendulum masses via common coupling elements enables one of the masses to compensate for the other when the first mass is urged into an offset position, such as when the engine is inoperative and not producing a rotational output. In this way, the pendulum masses may be cooperatively moved to provide mass balance in the centrifugal pendulum device. As a result, vibration cause by unbalance masses during engine restart is reduced (e.g., substantially eliminated), thereby reducing noise, vibration, and harshness (NVH) in the engine. Moreover, rotationally coupling the mass carrier, pendulum masses, and coupling element reduces the wear in the coupling mechanism when compared to prior centrifugal pendulum devices. As a result, the longevity of the centrifugal pendulum devices is increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventor herein, and are not admitted to be known.

DETAILED DESCRIPTION

Vibration is taking on increasing importance in the construction and design of motor vehicles and internal combustion engines. Attempts are being made, inter alia, to influence the noise caused by the internal combustion engine. This development work is also motivated by recognition of the fact that a customer's purchasing decision is partly influenced by the noise of the internal combustion engine and of the vehicle, especially from the point of view of comfort. The transmission of structure-borne noise to the body via the engine mountings is of special significance for acoustic driving comfort.

The phenomenon of vibration will be briefly explained in more detail with reference to the example of the crank gear and the crankshaft. The crankshaft, together with the engine parts coupled thereto, forms an oscillatory system. The crankshaft is excited to produce rotary oscillations by the time-variable rotational forces transmitted to the crankshaft via the connecting rods coupled to the individual crank pins. The rotary oscillations of the crankshaft generate noise both through structure-borne noise radiation and through transmission of structure-borne noise to the body and to the internal combustion engine. If the crankshaft is excited within its natural frequency range, large rotary oscillation amplitudes can occur, and can even lead to fatigue fracture. This last consideration indicates that vibration also plays a part with regard to the strength of components.

The rotary oscillations of the crankshaft lead to rotational speed oscillations of the internal combustion engine, and are also transmitted via the timing drive or camshaft drive to the camshaft, the camshaft itself also being an oscillatory system which can excite vibration in further systems, in particular the valve mechanism. The transmission of vibration to other ancillary units via traction drives driven by the crankshaft is also possible. In addition, the oscillations of the crankshaft are transmitted to the drive train, via which they may be transmitted onwards to the transmission and the drive shafts and as far as the tires of a vehicle.

In order to reduce rotational speed fluctuations, the mass of the oscillatory system is increased by arranging a flywheel on the crankshaft. As a result of the greater mass, the system has increased inertia. The rotary motion of the crankshaft becomes more uniform.

If the flywheel, which generally is fastened on one side to the crankshaft and on the other side via the clutch to the transmission, is in the form of a dual-mass flywheel, the flywheel additionally takes on the function of a vibration damper which reduces the rotary oscillations between the clutch and drive train.

To attenuate the rotary oscillations of the crankshaft and in the drive train, rotary oscillation dampers, that is, torsional vibration dampers, may be provided. As a result of a relative movement of the mass of the vibration damper with respect to the crankshaft, a portion of the rotary oscillation energy is dissipated through frictional work.

Centrifugal pendulum devices, the pendulum masses which do not lie within the power flow and which, when excited, move oppositely to the exciting oscillations, thus leading to the elimination or damping of the latter, may be used as torsional vibration dampers. With prior dampers or vibration absorbers, this effect occurs only at a certain frequency, namely the resonance frequency of the damper. A centrifugal pendulum device in which the restoring force is determined primarily by the centrifugal forces acting on the pendulum masses, by contrast, is a rotational-speed adaptive vibration absorber the natural frequency of which changes with rotational speed since the centrifugal forces are dependent on rotational speed. By means of a centrifugal pendulum device, therefore, it is possible to absorb a fixed order of excitation and not only a fixed frequency. This has particular advantages in internal combustion engines, in which a centrifugal pendulum device can be tuned to absorb any desired order of excitation.

The number of starts or restarts of an internal combustion engine is increasing. For instance, in some vehicles stop-and-go operation, also referred to as start/stop mode, may be implemented where the engine is switched off in the absence of an instantaneous power requirement in order to reduce fuel consumption, instead of allowing them to idle. In practice, this means that the internal combustion engine is switched off while the vehicle is not moving. One application of stop-and-go operation is the traffic situation arising, for example, in congestion on motorways and major roads. In inner-city traffic stop-and-go operation may be highly desired, as a result of the presence of uncoordinated traffic lights, railway crossing, etc. The number of start-up processes is therefore increasing.

To overcome at least a portion of the aforementioned prior art shortcomings, an internal combustion engine with a centrifugal pendulum device is described herein. The centrifugal pendulum device includes at least one pendulum mass carrier which is rotatable about an axis of rotation and at least one pendulum mass pair comprising two pendulum masses arranged movably on the pendulum mass carrier, opposite one another and at a distance from the axis of rotation. A method for producing the aforementioned centrifugal pendulum device is also described herein.

In one example, an internal combustion engine is provided. The engine includes a centrifugal pendulum device having at least one pendulum mass carrier which is rotatable about an axis of rotation and at least one pendulum mass pair comprising two pendulum masses arranged movably on the pendulum mass carrier opposite one another and at a distance from the axis of rotation, wherein the pendulum masses are connected to one another by means of at least two movable coupling elements arranged on each side of the axis of rotation and at a distance from the axis rotation, and wherein each coupling element is pivoted to each of the two pendulum masses in order to form the connection of the two pendulum masses, and each coupling element is pivoted to the pendulum mass carrier.

The aforementioned configuration of the centrifugal pendulum device has the result that, even with the internal combustion engine inoperative and the pendulum mass carrier stationary, the pendulum masses cannot form an unbalanced mass by adopting corresponding positions. The problems known from the prior art resulting from the fact that the pendulum masses must first be moved from an unbalanced position to a working position when the stationary pendulum mass carrier is set into rotation again, for example when starting the internal combustion engine, are thereby substantially eliminated.

Further in one example, the two pendulum masses forming a pendulum mass pair are connected to one another by the use of coupling elements, as previously discussed. The coupling elements provide a kinematic coupling of the two pendulum masses or of their movements and ensure that, if one pendulum mass adopts a position deviating from the zero state, the other pendulum mass adopts a compensating position with regard to the formation of an unbalanced mass. The movement executed by one pendulum mass of a pendulum mass pair is not independent of the movement of the respective other pendulum mass, but rather is in a permanent interrelationship with this movement or pendulum mass.

The coupling elements themselves are arranged movably on each side of and at a distance from the axis of rotation and are pivoted to the pendulum mass carrier. The coupling elements therefore provide not only a connection of the pendulum masses to one another, but also guidance of the pendulum masses on the pendulum mass carrier along predefined paths, that is, along predefined movement curves. A more extensive positive control, as known from the prior art, for example by means of openings formed in the pendulum masses and rollers or pins provided on the pendulum mass carrier, may not be needed, if desired.

As compared to the centrifugal pendulum devices described in the prior art, which have a kinematically over-determined and very complex positive guidance of the pendulum masses, the centrifugal pendulum device described herein is additionally distinguished by simple construction and the small number of components. The simple construction of the device considerably lowers the manufacturing cost of the device.

The small number of components lowers the production costs, the assembly time and therefore the assembly costs for the centrifugal pendulum device. In addition, assembly errors are mitigated. The susceptibility to failure of the centrifugal pendulum device decreases, ensuring a high degree of operational reliability and increasing durability and service life.

With the internal combustion engine described herein, some of the problems of prior art pendulum absorbers are overcome. In one example, each coupling element in the centrifugal pendulum device has a bar-shaped configuration. A bar-shaped coupling element makes possible the articulated connection of the pendulum masses with small utilization of material. Thus, each coupling element may have a rectangular shape.

In another example, each coupling element in the centrifugal pendulum device is pivoted at its center. The central pivoting of the coupling elements enables a symmetrical connection of the two pendulum masses forming a pendulum mass pair and for similar relationships of forces in the articulated connections to the pendulum masses.

In yet another example, the pendulum mass carrier in the centrifugal pendulum device has a pin and the coupling elements a bore corresponding to this pin, in order to form a bearing arrangement between the coupling element and the pendulum mass carrier. The pin and the bore enable an articulated connection of a coupling element to the pendulum mass carrier in a manner similar to a plain bearing to be formed, while using a decreased number of components, if desired. In addition, this provides the possibility of forming, that is, producing, the pin integrally with the pendulum mass carrier and in a single work cycle, if desired.

To form the bearing arrangement, the coupling element may have the pin and the pendulum mass carrier, the bore corresponding to the pin. The bearing arrangement may also include intermediate elements such as bearing shells or rolling bearings.

In another example, each pendulum mass in the centrifugal pendulum device may have a curved, crescent-shaped form. Thus, the pendulum masses may have a crescent shape, in one example. A curved shape enables, firstly, a large amount of mass to be positioned at a distance from the axis of rotation. The curved shape also enables the two crescent-shaped pendulum masses to lie opposite each other at their ends, simplifying the connection of the pendulum masses by means of coupling elements.

Further in one example, the two pendulum masses in the centrifugal pendulum device form a pendulum mass pair and are connected to one another at their ends by coupling elements. In yet another example, in the centrifugal pendulum device a bearing arrangement may be formed between a coupling element and a pendulum mass, the pendulum mass has a spigot and the coupling element includes a bore corresponding to this spigot. What has been discussed above regarding the coupling arrangement (e.g., bearing arrangement) between a coupling element and the pendulum mass carrier may also be applied analogously to the coupling arrangement (e.g., bearing arrangement) between a coupling element and a pendulum mass. In particular, in order to form the bearing arrangement the coupling element may include the spigot and the pendulum mass, the bore corresponding to the spigot. The use of intermediate elements, as in the bearing arrangement on the pendulum mass carrier described herein, may also be used.

Additionally in one example, the pendulum masses in the centrifugal pendulum device may be connected to the pendulum mass carrier only via coupling elements. However, other coupling techniques have been contemplated.

The omission of additional positive control of the pendulum masses on the pendulum mass carrier, for example by means of openings and rollers as described in the prior art, considerably simplifies the centrifugal pendulum device. The simple construction of the device reduces the number of components and lowers the manufacturing costs. If a pin and/or a spigot is/are provided for the bearing arrangement of a coupling element, examples of the internal combustion engine in which the spigot of the pendulum mass and/or the pin of the at least one pendulum mass carrier is/are coated with a substance may be used.

If a pin and/or a spigot is/are provided for the bearing arrangement of a coupling element, embodiments of the internal combustion engine in which the spigot of the pendulum mass and/or the pin of the at least one pendulum mass carrier is/are surface-treated with a substance may be utilized.

If a pin and/or a spigot is/are provided for the bearing arrangement of a coupling element, embodiments of the internal combustion engine in which the bore of the coupling element corresponding to a pin and/or the bore of the coupling element corresponding to a spigot is/are coated may be used.

If a pin and/or a spigot is/are provided for the bearing arrangement of a coupling element, embodiments of the internal combustion engine in which the bore of the coupling element corresponding to a pin and/or the bore of the coupling element corresponding to a spigot is/are surface-treated with a substance may be utilized.

A coating or a surface-treatment of the pin, the spigot and/or the bore according to the above examples can serve to set a coefficient of friction in the bearing arrangement and therefore to tune the centrifugal pendulum device in which the restoring force, although determined by the centrifugal forces acting on the pendulum masses, is also determined by the frictional forces in the bearings to a predetermined order of excitation.

Embodiments of the internal combustion engine in which the internal combustion engine can be operated in the stop-and-go mode may also be used. Thus, the engine may be configured to be operated in the stop-and-go mode.

As already mentioned, the pendulum masses of the centrifugal pendulum device described herein may not be configured to adopt positions in which they form an unbalanced mass even when the pendulum mass carrier is stationary. If the stationary pendulum mass carrier is then set in rotation, for example when starting the internal combustion engine, the pendulum masses are either in the zero state or already in a working position and may not need to be moved out of a position in which they form an unbalanced mass. The centrifugal pendulum device described herein is therefore especially suited for internal combustion engines which are operable or are operated in the stop-and-go mode.

Embodiments of the internal combustion engine in which the centrifugal pendulum device is configured in combination with a dual-mass flywheel may also be used. If the centrifugal pendulum device or the pendulum masses thereof are to be tuned to the primary order of excitation of the internal combustion engine in order to absorb the excitation oscillations, this may not be achieved if the device is arranged on the crankshaft or on a rigid flywheel, since the engine irregularities are too large and the angles of oscillation and the masses may not be selected large enough because of the small space available.

On the other hand, effective absorption can be achieved if the centrifugal pendulum device is combined with a dual-mass flywheel. In this case the centrifugal pendulum device is coupled to the secondary side of the dual-mass flywheel, that is, to the element which is subjected to only a fraction of the original oscillation. Substantially smaller pendulum masses and angles of oscillation may then be sufficient to compensate the residual oscillations.

A method for producing a centrifugal pendulum device of an internal combustion engine of an aforementioned type is also described herein. The method may include manufacturing a centrifugal pendulum device in which a pin and/or a spigot is/are provided for the bearing arrangement of a coupling element. The method may include forming in one piece at least one pendulum mass carrier together with pins, and/or the pendulum masses of the pendulum mass pair together with spigots. The one-piece configuration of pendulum mass carrier and pin, or pendulum mass and spigot, makes it possible to produce the pendulum mass carrier together with pins, and the pendulum masses together with spigots, in one work cycle, if desired.

Furthermore, the one-piece configuration by its nature produces a connection of the pendulum mass carrier to the pins, or of the pendulum mass to the spigot, by a material joint, so that the connecting elements previously needed for a non-positive or positive connection may be dispensed with if desired, together with the time required for producing the connection.

The structure of the centrifugal pendulum device may be simplified by the small number of components. This reduces the manufacturing costs of the device. The features of the internal combustion engines may be constructed via the aforementioned manufacturing method. Embodiments of the method in which the at least one pendulum mass carrier together with pins, and/or the pendulum masses of the at least one pendulum mass pair together with spigots, are produced in one piece via cold forming may be used. The cold forming method may have high dimensional accuracy. The coefficient of friction in the bearing arrangement between a coupling element and a pendulum mass, and/or the coefficient of friction in the bearing arrangement between a coupling element and the pendulum mass carrier, may be set in a specified manner by after-treatment of the bore, the spigot and/or the pin, in on example.

Figure 2A:
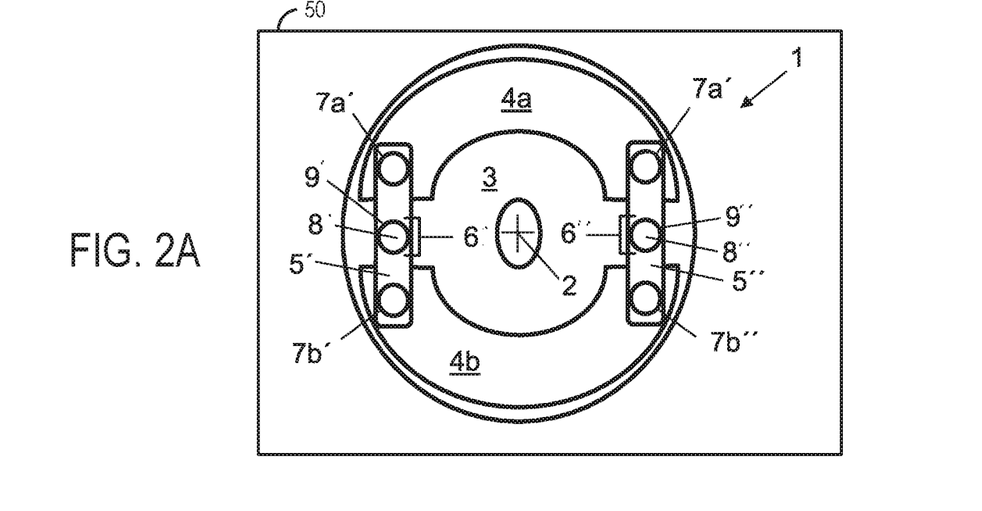
FIG. 2A shows schematically in a side view a centrifugal pendulum device of a first embodiment of the internal combustion engine in the zero state.

FIG. 2a shows schematically in a side view a centrifugal pendulum device 1 of a first embodiment of the internal combustion engine in the zero state. A zero state of the device is when the device's rotational speed is substantially 0. The differences from the centrifugal pendulum device according to the prior art represented in prior art FIG. 1a are discussed in greater detail herein. For like components, that is, for components having like functions, corresponding reference symbols are used.

The centrifugal pendulum device 1 of FIG. 2a has a pendulum mass carrier 3 which is rotatable about an axis of rotation 2 and a pendulum mass pair 4 comprising two pendulum masses 4a, 4b which are arranged movably on the pendulum mass carrier 3 opposite one another and at a distance from the axis of rotation 2. The centrifugal pendulum device 1 may be included in an engine 50. It will be appreciated that the engine is configured to provide a rotational output to the pendulum mass carrier 3.

In contrast to the centrifugal pendulum device 21 represented in FIG. 1a, the crescent-shaped pendulum masses 4a, 4b, shown in FIG. 2a are connected to one another at their ends by means of two movable coupling elements 5', 5" arranged on each side of the axis of rotation 2 and at a distance from the axis of rotation 2.

The bar-shaped coupling elements 5', 5" are themselves pivoted at their centers on the pendulum mass carrier 3, the pendulum mass carrier 3 having a pin 8', 8" and the coupling element 5', 5" having a bore 9', 9" corresponding to this pin 8', 8" in order to form the bearing arrangement 6', 6" between a coupling element 5', 5" and the pendulum mass carrier 3. Thus the coupling elements are rotationally coupled to the pendulum mass carrier. It will be appreciated that the coupling elements have a rectangular shape. However, other coupling element shapes have been contemplated.

Additionally, in order to form the connection between the two pendulum masses 4a, 4b, each coupling element 5', 5" is pivoted (e.g., rotationally coupled) to each of the pendulum masses 4a, 4b, the pendulum mass 4a, 4b having a spigot and the coupling element 5', 5" having a bore corresponding to this spigot in order to form the bearing arrangement 7a', 7a", 7b', 7b" between a coupling element 5', 5" and a pendulum mass 4a, 4b. The bearing arrangements are radially aligned, in the depicted example. Therefore it will be appreciated that the bearing arrangements may be spigot bearings, in one example. However, other types of bearing arrangements have been contemplated.

Figure 2B:
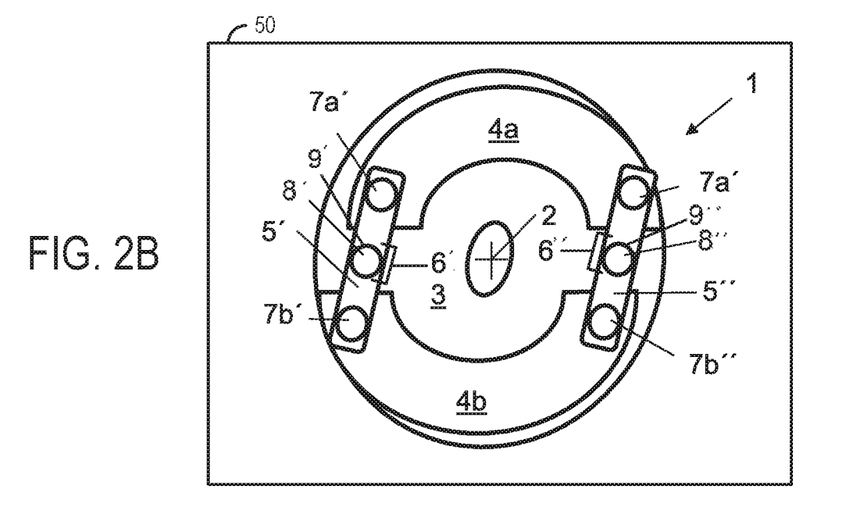
FIG. 2B shows schematically in a side view the centrifugal pendulum device represented in FIG. 2A in a working position.

The coupling elements 5', 5" provide not only a connection between the pendulum masses 4a, 4b, but also guidance of the pendulum masses 4a, 4b on the pendulum mass carrier 3 along predefined paths. FIG. 2b shows the centrifugal pendulum device 1 in a working position with the pendulum mass carrier 3 revolving. More extensive positive control, for example by means of openings and rollers may not be used, if desired.

Figure 2C:
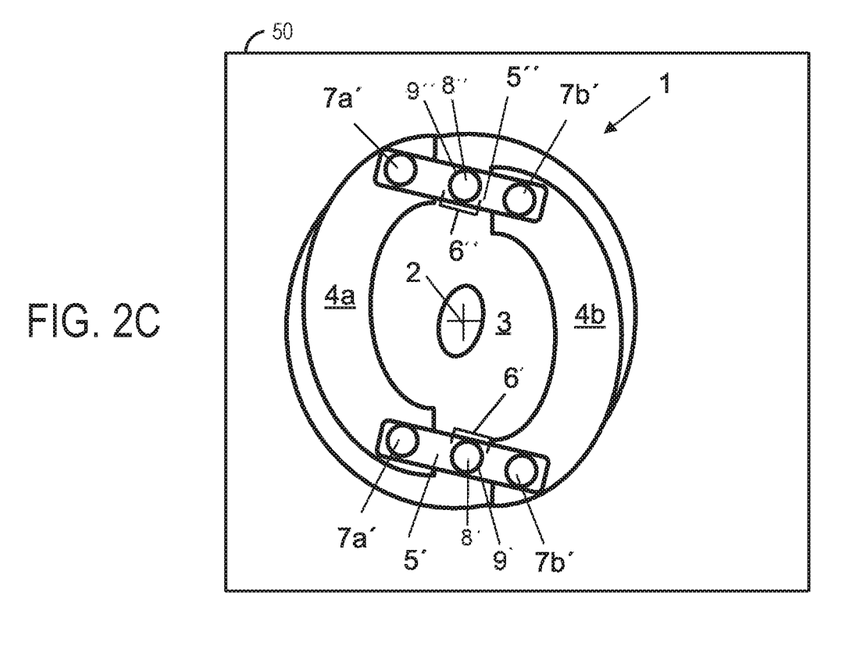
FIG. 2C shows schematically in a side view the centrifugal pendulum device represented in FIG. 2A in a position in which the internal combustion engine is inoperative.

The coupling elements 5', 5" provide a kinematic coupling between the two pendulum masses 4a, 4b, especially when a pendulum mass 4a, 4b adopts a position deviating from the zero state of FIG. 2a. The movement performed by one of the pendulum masses 4a, 4b of the pendulum mass pair 4 is not independent of the movement of the other pendulum mass but rather is in permanent interrelationship therewith. Consequently, the pendulum masses 4a, 4b do not form an unbalanced mass even when the internal combustion engine is inoperative and the pendulum mass carrier 3 is stationary, as can be seen from FIG. 2c. In other words, the coupling elements jointly urge the pendulum masses in different directions to provide mass balance in the device. Thus, one of the pendulum masses may be urged in a first direction and the other pendulum mass may be urged in a second direction offsetting the change in position of the first pendulum mass to provide the mass balance.

Figure 3:
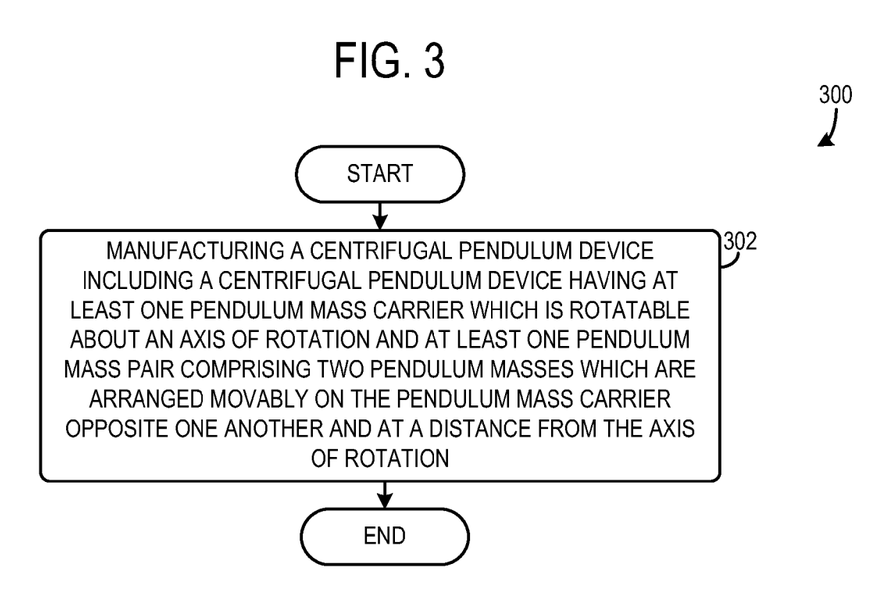
FIG. 3 shows a method for producing a centrifugal pendulum device.

FIG. 3 shows a method 300 for producing a centrifugal pendulum device of an internal combustion engine. The method 300 may be used to produce the centrifugal pendulum device described above with regard to FIGS. 2a-2c or may be used to produce another suitable centrifugal pendulum device.

At 302 the method includes manufacturing a centrifugal pendulum device including a centrifugal pendulum device having at least one pendulum mass carrier which is rotatable about an axis of rotation and at least one pendulum mass pair comprising two pendulum masses which are arranged movably on the pendulum mass carrier opposite one another and at a distance from the axis of rotation. The pendulum masses may be connected to one another by at least two movable coupling elements arranged on each side of the axis of rotation and at a distance from the axis of rotation, each coupling element, pivotally coupled to each of the two pendulum masses in order to form the connection between the two pendulum masses, and pivotally coupled to the pendulum mass carrier. Additionally, the at least one pendulum mass carrier together with pins, and the pendulum masses of the at least one pendulum mass pair together with spigots, may be formed in one piece.

In one example, at least one of the pendulum mass carrier together with pins, and the pendulum masses of the at least one pendulum mass pair together with spigots, are produced in one piece by cold forming. In another example, the coefficient of friction in the bearing arrangement between a coupling element and a pendulum mass, and the coefficient of friction in the bearing arrangement between a coupling element and the pendulum mass carrier, may be determined by an after-treatment of at least one of the bore, of the spigot, and of the pin.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
a centrifugal pendulum device having at least one pendulum mass carrier which is rotatable about an axis of rotation and at least one pendulum mass pair comprising two pendulum masses which are arranged movably on a same side of the pendulum mass carrier, opposite one another, and at a distance from the axis of rotation;
where the pendulum masses are connected to one another by at least two movable coupling elements arranged on each side of the axis of rotation and at a distance from the axis of rotation, each movable coupling element:
pivotally coupled to each of the two pendulum masses in order to form a connection between the two pendulum masses; and
pivotally coupled to the pendulum mass carrier, where the two pendulum masses are identical in shape and have a crescent shape, and where the pendulum masses are each connected to the pendulum mass carrier only via the movable coupling elements and a bearing arrangement, each of the movable coupling elements directly coupled to the pendulum mass carrier via a pin positioned between ends of each of the movable coupling elements.

2. The internal combustion engine of claim 1, where each movable coupling element has a rectangular shape.

3. The internal combustion engine of claim 1, where each movable coupling element is bar-shaped.

4. The internal combustion engine of claim 1, where each pendulum mass has a curved, crescent-shaped basic form.

5. The internal combustion engine of claim 1, where the two pendulum masses forming the pendulum mass pair are connected to one another at their ends by the movable coupling elements.

6. The internal combustion engine of claim 1, where in order to form the bearing arrangement between one of the movable coupling elements and the pendulum mass carrier, the pendulum mass carrier has the pin and the movable coupling elements each have a bore corresponding to this pin.

7. The internal combustion engine of claim 1, where each pin directly coupling each of the movable coupling elements to the pendulum mass carrier is positioned at a center of the movable coupling element.

8. The internal combustion engine of claim 1, where each of the movable coupling elements themselves are pivoted about their respective centers, and where the center of each of the movable coupling elements is a central axis positioned between the pendulum masses.

9. The internal combustion engine of claim 1, where the internal combustion engine is configured to operate in a stop-and-go mode.

10. A centrifugal pendulum device coupled to a rotational component in an engine comprising:
a pendulum mass carrier;
a movable coupling element directly rotatably coupled to the pendulum mass carrier via a first bearing element, the movable coupling element forming a continuous piece of material; and
two crescent-shaped pendulum masses, identical in shape, spaced away from one another on a same side of the pendulum mass carrier, and each rotatably coupled to the movable coupling element via a second bearing element and a third bearing element.

11. The centrifugal pendulum device of claim 10, where the bearing elements are spigot bearings.

12. The centrifugal pendulum device of claim 11, where the bearing elements are radially aligned, where the movable coupling element pivots about a central axis positioned between the pendulum masses.

13. The centrifugal pendulum device of claim 10, where a pin articulates the movable coupling element to the pendulum mass carrier via a bore of the movable coupling element.

14. The centrifugal pendulum device of claim 10, where the movable coupling element is bar-shaped.

15. The centrifugal pendulum device of claim 10, where the first bearing element is positioned at a center of the movable coupling element, and where the movable coupling element itself pivots about a center of the movable coupling element.

* * * * *